(12) United States Patent
Yum et al.

(10) Patent No.: US 10,136,422 B2
(45) Date of Patent: Nov. 20, 2018

(54) METHOD OF RECEIVING DOWNLINK SIGNAL AND APPARATUS FOR THE SAME

(71) Applicant: LG ELECTRONICS INC., Seoul (KR)

(72) Inventors: Kunil Yum, Seoul (KR); Yunjung Yi, Seoul (KR); Bonghoe Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 182 days.

(21) Appl. No.: 15/179,807

(22) Filed: Jun. 10, 2016

(65) Prior Publication Data

US 2016/0366669 A1    Dec. 15, 2016

Related U.S. Application Data

(60) Provisional application No. 62/234,656, filed on Sep. 29, 2015, provisional application No. 62/173,971, filed on Jun. 11, 2015.

(51) Int. Cl.
*H04W 72/04* (2009.01)
*H04L 5/00* (2006.01)
*H04W 4/70* (2018.01)

(52) U.S. Cl.
CPC ........ *H04W 72/042* (2013.01); *H04L 5/0053* (2013.01); *H04W 4/70* (2018.02)

(58) Field of Classification Search
None
See application file for complete search history.

(56) References Cited

U.S. PATENT DOCUMENTS

| 2016/0182209 | A1* | 6/2016 | Li | H04L 5/0092 370/329 |
| 2016/0286580 | A1* | 9/2016 | Liu | H04W 4/005 |
| 2017/0303064 | A1* | 10/2017 | Park | H04W 4/005 |

FOREIGN PATENT DOCUMENTS

| CN | 106717031 A | * | 9/2014 |
| CN | 107135473 A | * | 9/2014 |

* cited by examiner

*Primary Examiner* — Kodzovi Acolatse
*Assistant Examiner* — Manuel Rangel
(74) *Attorney, Agent, or Firm* — Lee Hong Degerman Kang Waimey

(57) ABSTRACT

Provided herein is a method of receiving a downlink signal in a wireless communication system, the method being implemented by a cellular-IoT (Internet of things) (CIoT) mobile terminal and including searching for control information directed to the mobile terminal in a plurality of candidate downlink control channel resource regions corresponding to a coverage class of the mobile terminal on a part of a downlink resource, and receiving a downlink data channel indicated by control information received in at least one of the plurality of candidate downlink control channel resource regions, wherein the plurality of candidate downlink control channel resource regions is configured to have a period set for each of coverage classes, wherein each of the plurality of candidate downlink control channel resource regions is configured to have a duration configured for each of the coverage classes.

12 Claims, 10 Drawing Sheets

(a)

(b)

FIG. 13
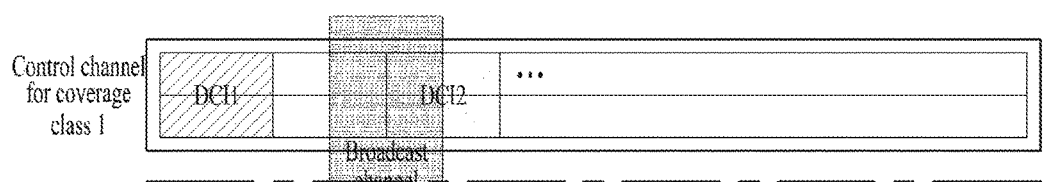
(a)
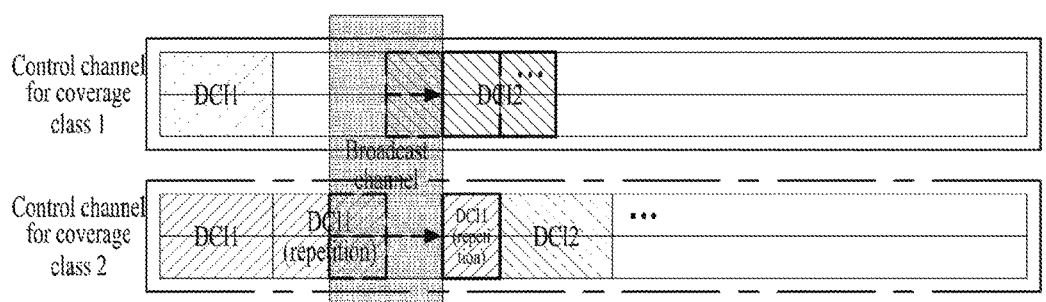
(b)

METHOD OF RECEIVING DOWNLINK SIGNAL AND APPARATUS FOR THE SAME

Pursuant to U.S.C. § 119(e), this application claims the benefit of U.S. Provisional Application No. 62/173,971, filed on Jun. 11, 2015 and 62/234,656, filed on Sep. 29, 2015, the contents of which are all hereby incorporated by reference herein in their entirety.

BACKGROUND OF THE INVENTION

Field of the Invention

The present invention relates to a wireless communication system and, more particularly, to a method of receiving a downlink signal and an apparatus for the same.

Discussion of the Related Art

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

SUMMARY OF THE INVENTION

Provided is a method of receiving a downlink signal in a wireless communication system is implemented by a cellular-IoT (Internet of things) (CIoT) mobile terminal and includes searching for control information directed to the mobile terminal in a plurality of candidate downlink control channel resource regions corresponding to a coverage class of the mobile terminal on a part of a downlink resource, and receiving a downlink data channel indicated by control information received in at least one of the plurality of candidate downlink control channel resource regions, wherein the plurality of candidate downlink control channel resource regions is configured to have a period set for each of coverage classes, wherein each of the plurality of candidate downlink control channel resource regions is configured to have a duration configured for each of the coverage classes.

Additionally or alternatively, when the mobile terminal receives the control information directed to the mobile terminal over first N regions among the plurality of candidate downlink control channel resource regions, the mobile terminal may be configured not to perform the searching in remaining M-N regions of the plurality of candidate downlink control channel resource regions, wherein M may be the number of the plurality of candidate downlink control channel resource regions for the mobile terminal, and N may be an integer greater than 1.

Additionally or alternatively, the control information may include common control information and dedicated control information, wherein the common control information may include cell-specific control information and coverage class-specific control information, wherein the cell-specific control information may be received on a resource independent from the plurality of candidate downlink control channel resource regions configured for each of coverage classes.

Additionally or alternatively, the cell-specific control information may include an indicator indicating whether dedicated control information for the mobile terminal is transmitted in association with the cell-specific control information.

Additionally or alternatively, the coverage class-specific control information may include information about a length of dedicated control information for the mobile terminal.

Additionally or alternatively, the information about a length of the dedicated control information may be received in every K candidate downlink control channel resource regions of the plurality of candidate downlink control channel resource regions, where K may be an integer greater than 1.

Additionally or alternatively, the dedicated control information directed to the mobile terminal may be followed by information about a length of dedicated control information for the mobile terminal as a preamble associated with the dedicated control information.

Additionally or alternatively, information about a length of dedicated control information for the mobile terminal may be scrambled with a pilot signal or reference signal received in a candidate downlink control channel resource region in which the dedicated control information is received.

In another aspect of the present invention, a cellular-IoT (Internet of things) (CIoT) mobile terminal configured to receive a downlink signal in a wireless communication system includes a transmitter and a receiver, and a processor configured to control the transmitter and the receiver, wherein the processor is configured to search for control information directed to the mobile terminal in a plurality of candidate downlink control channel resource regions corresponding to a coverage class of the mobile terminal on a part of a downlink resource, and receive a downlink data channel indicated by control information received in at least one of the plurality of candidate downlink control channel resource regions, wherein the plurality of candidate downlink control channel resource regions is configured to have a period set for each of coverage classes, wherein each of the plurality of candidate downlink control channel resource regions is configured to have a duration configured for each of the coverage classes.

Additionally or alternatively, when the processor receives the control information directed to the mobile terminal over first N regions among the candidate downlink control channel resource regions, the processor may be configured not to perform the searching in remaining M-N regions of the plurality of candidate downlink control channel resource regions, wherein M may be the number of the plurality of candidate downlink control channel resource regions for the UE, and N may be an integer greater than 1.

Additionally or alternatively, the control information may include common control information and dedicated control information, wherein the common control information may include the cell-specific control information and coverage class-specific control information, wherein the cell-specific control information may be received on a resource independent from the plurality of candidate downlink control channel resource regions configured for each of coverage classes.

Additionally or alternatively, the cell-specific control information may include an indicator indicating whether dedicated control information for the mobile terminal is transmitted in association with the cell-specific control information.

Additionally or alternatively, the coverage class-specific control information may include information about a length of dedicated control information for the mobile terminal.

Additionally or alternatively, the information about a length of the dedicated control information may be received in every K candidate downlink control channel resource regions of the plurality of candidate downlink control channel resource regions, where K may be an integer greater than 1.

Additionally or alternatively, the dedicated control information directed to the mobile terminal may be followed by information about a length of dedicated control information for the mobile terminal as a preamble associated with the dedicated control information.

Additionally or alternatively, information about a length of dedicated control information for the mobile terminal may be scrambled with a pilot signal or reference signal received in a candidate downlink control channel resource region in which the dedicated control information is received.

The technical solutions described above are simply a part of embodiments of the present invention. Various embodiments reflecting technical features of the present invention will be derived and understood from the following detailed description of the present invention by those having ordinary skill in the art.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 13 illustrates shifts of DCI transmission according to an embodiment of the present invention;

DETAILED DESCRIPTION OF THE INVENTION

Figure 1:
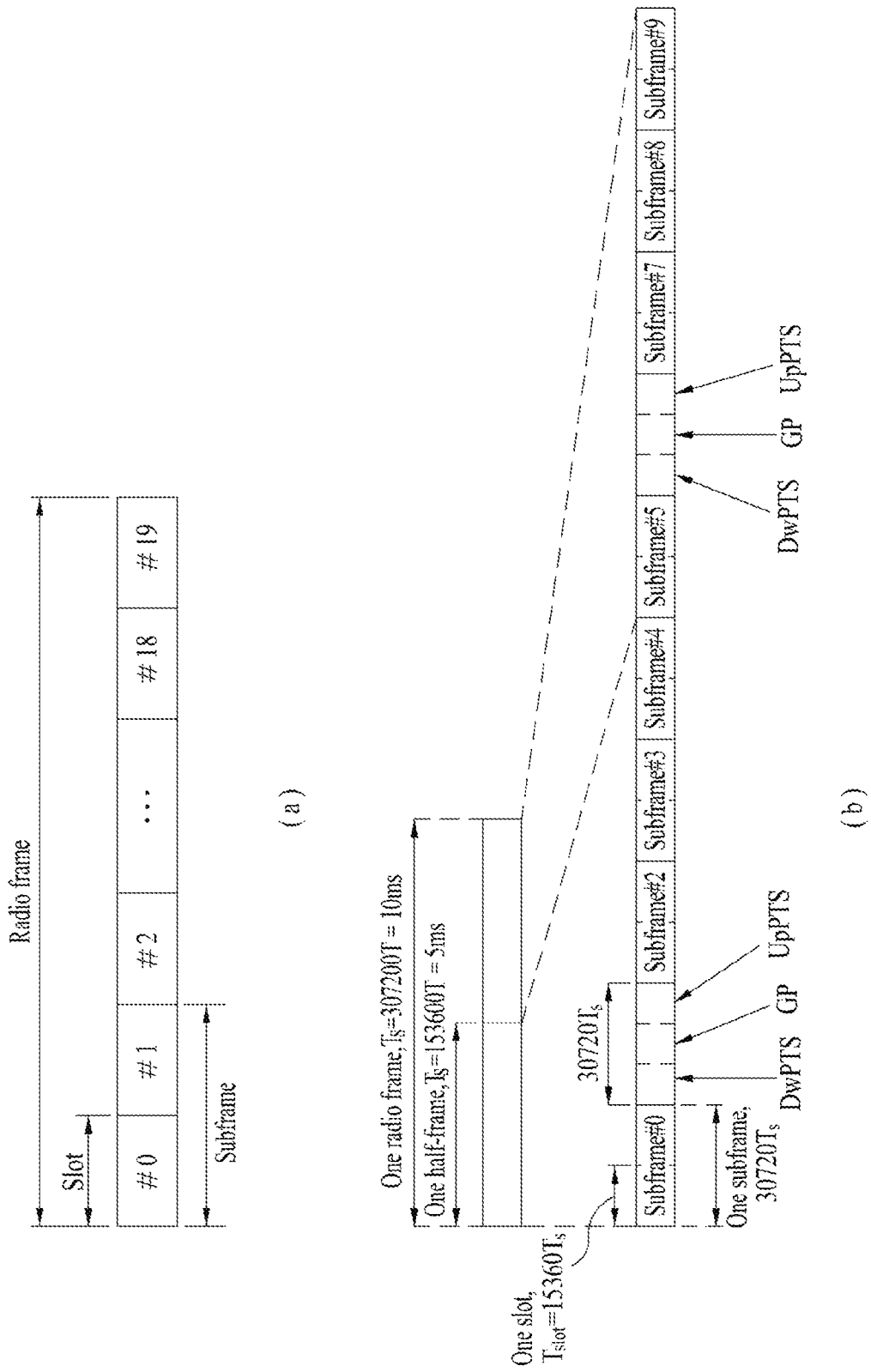
FIG. 1 illustrates an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals)

transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | \multicolumn{10}{c}{Subframe number} |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Figure 2:
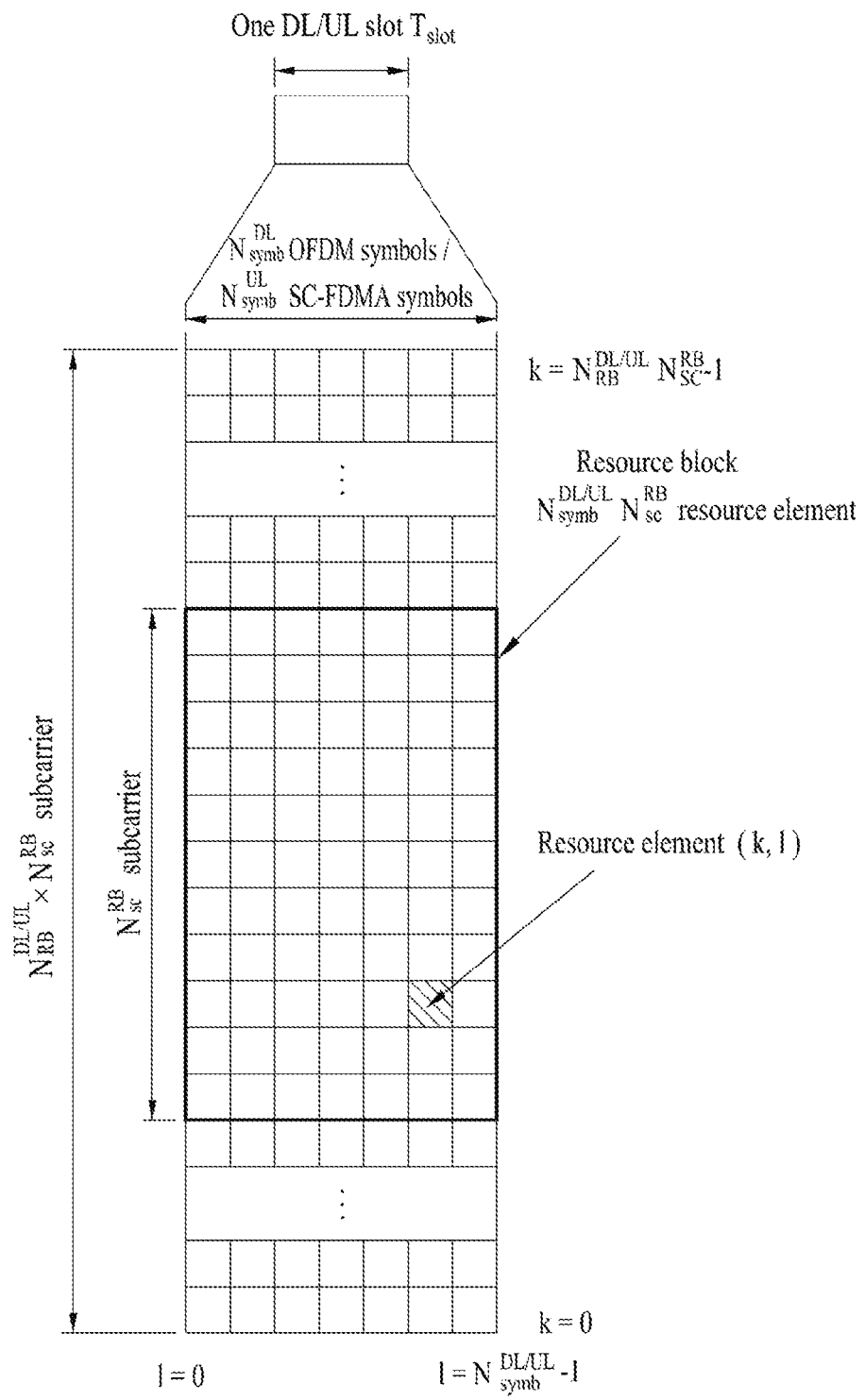
FIG. 2 is a diagram illustrating an example of a downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
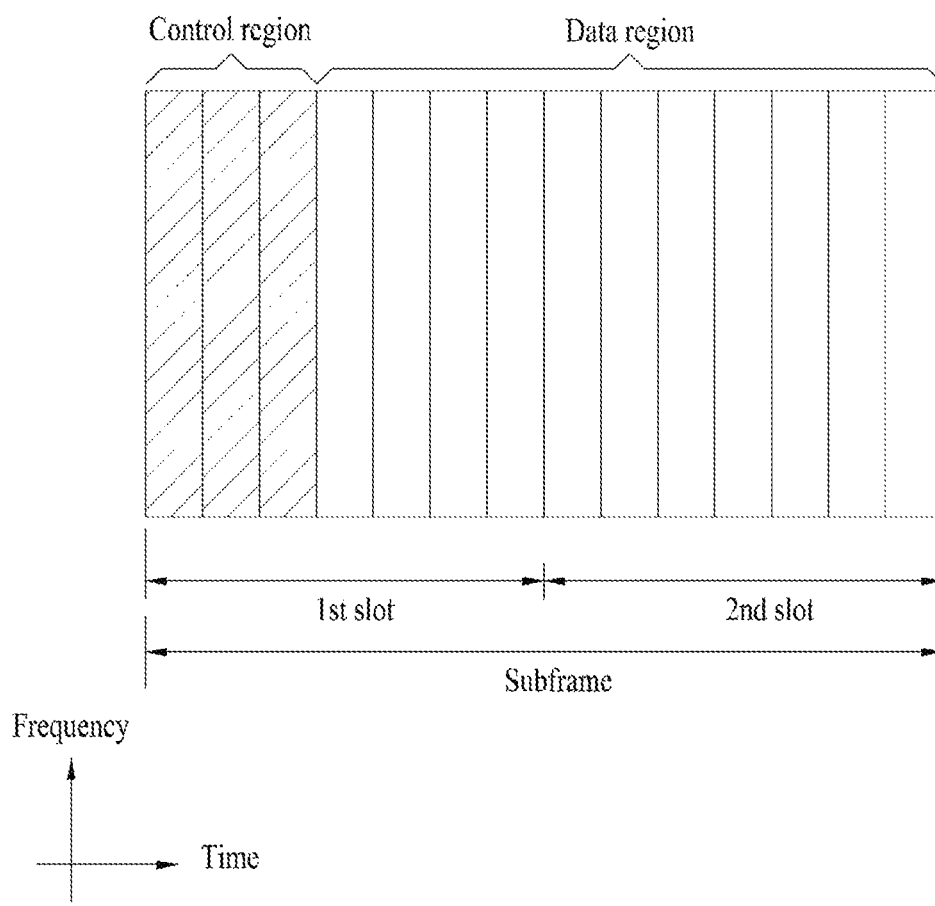
FIG. 3 is a diagram illustrating a down (DL) subframe structure used in 3GPP LTE/LTE-A.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

Search Space

| Type | Aggregation Level L | Size [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
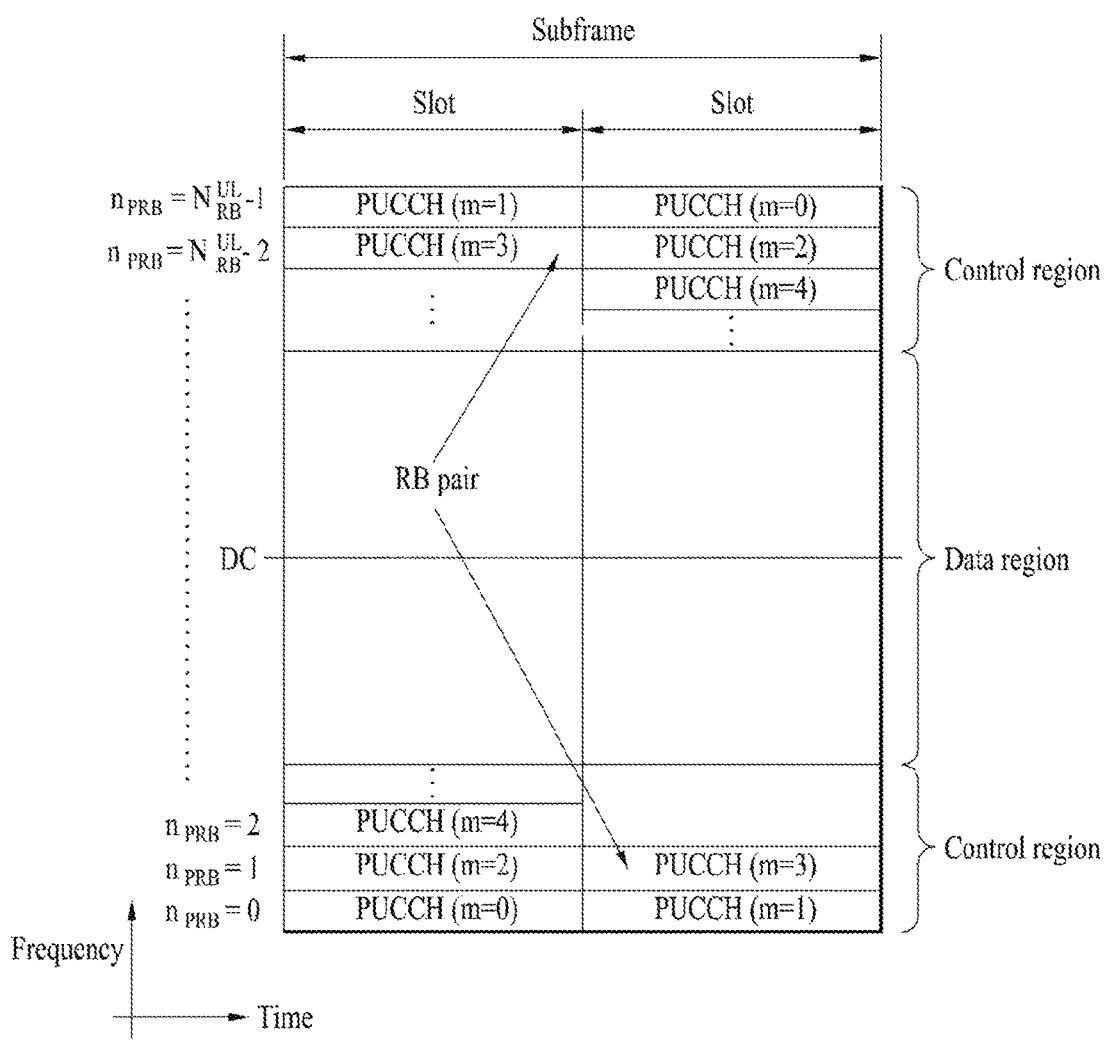
FIG. 4 is a diagram illustrating an uplink (UL) subframe structure used in 3GPP LTE/LTE-A.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (HACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

In next-generation systems such as GERAN (GSM EDGE Radio Access Network), constructing a UE of low cost/low specification which mainly performs data communication for, for example, reading of a meter, measurement of water level, utilization of a surveillance camera, stock report about a vending machine, and the like is considered. Such a network is called Internet-of-Things (IoT). In particular, IoT implemented over cellular networks is referred to as CIoT. In the GERAN, a method of supporting CIoT UEs using a standard independent from the legacy GERAN is considered as a clean-slate approach. Particularly, in clean-slate CIoT, OFDM is taken into consideration as a physical structure. In this case, a control channel for transmitting control information to UEs is needed.

For a CIoT UE, the amount of transmitted data is small, and uplink/downlink data transmission/reception occasionally occurs. Accordingly, it is efficient to reduce the price per terminal and battery consumption according to the low data transfer rate mentioned above. In particular, in an environment such as CIoT, a situation in which multiple UEs having a small transport block size coexist is considered, and therefore a control channel needs to be designed in consideration of such situation.

Design of Control Channel

Figure 5:
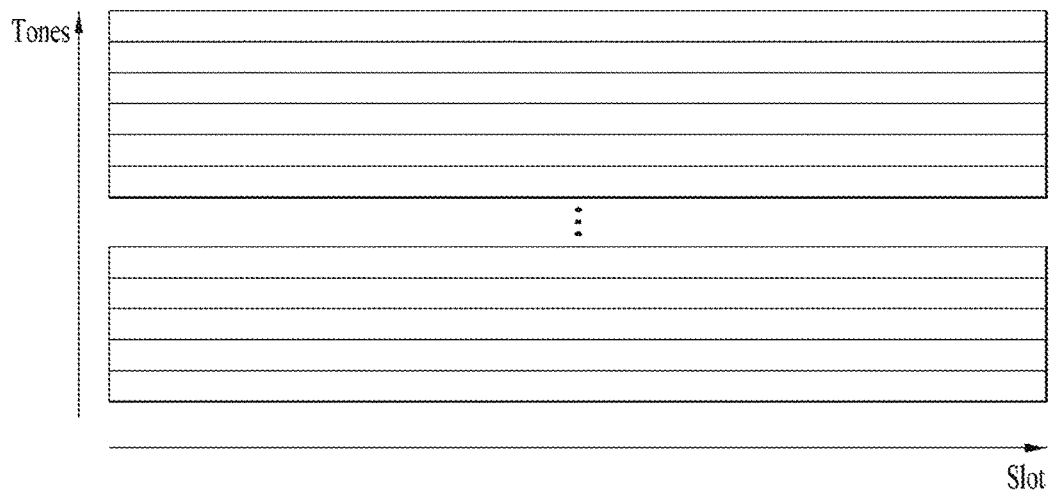
FIG. 5 illustrates an OFDM structure for GERAN CIoT.

For GERAN CIoT, an OFDM structure as shown in FIG. 5 is taken into consideration. In this structure, some resources may be dedicated to a control channel.

Figure 6:
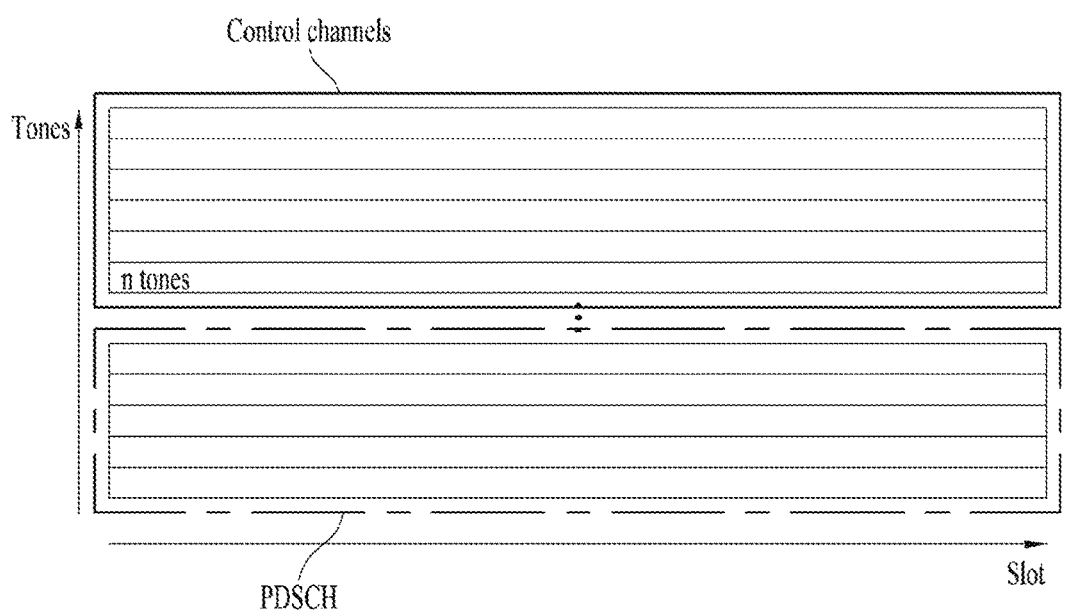
FIGS. 6, 7, 8 and 9 illustrate resource allocation for control channel according to an embodiment of the present invention.
Figure 7:
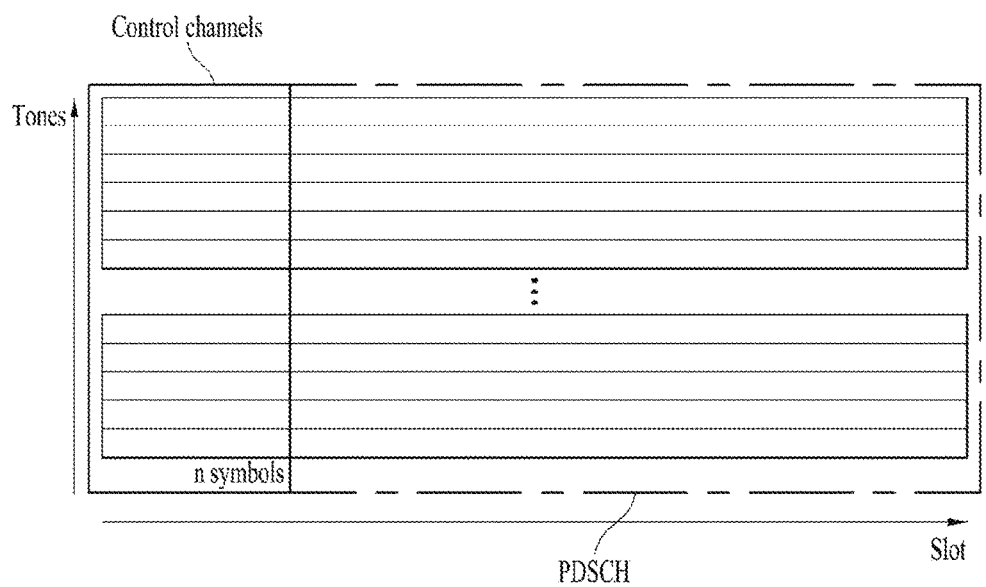

A certain frequency region may be allocated to the control channel as shown in FIG. 6. A certain time region may be allocated to the control channel as shown in FIG. 7.

Size n of the control channel may be configured through higher-layer signaling or system information (SI). The maximum coverage level supported by one system may differ from the maximum coverage level supported by another system, and the number of UEs to be supported may also differ among coverage levels. Accordingly, a different number of resources may need to be allocated to each coverage level for the control channel. This may generally mean that the transmission period of the control channel, offset, the number of tones used and the index of a starting tone need to be set for each converge enhancement (CE) level, and a coverage level supported by the network may also be correspondingly adjusted. In other words, the network may set, through the SI, the number of CE levels that the network intends to support, and the CE levels mapped to the respective numbers may be expressed by indexes in a pre-designated table. For example, one table may be configured as shown below, and corresponding mapping may be configured using SI.

TABLE 5

| Coverage class | No. of tones | No. of slots | Coding rate | Modulation | Total No. of Tones | Total No. of Messages per frame | Tx power/tone (dBm) |
| --- | --- | --- | --- | --- | --- | --- | --- |
| 5 | 6 | 24 | 1/24 | BPSK | 18 | 3 | 27 |
| 4 | 4 | 12 | 1/8 | BPSK | 16 | 8 | 24 |
| 3 | 2 | 6 | 1/2 | BPSK | 16 | 32 | 23 |
| 2 | 2 | 2 | 3/4 | QPSK | 14 | 84 | 23 |
| 1 | 2 | 1 | 1/2 | 16 QAM | 2 | 24 | 21 |

Figure 8:
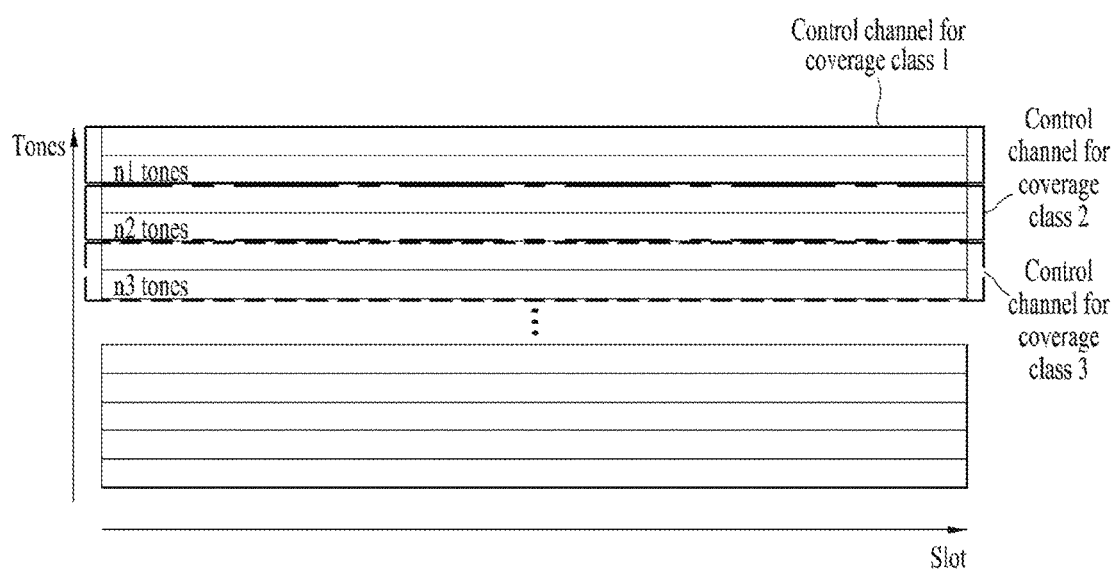

In CIoT, coverage classes are defined for UEs present in an environment (e.g. a basement) providing poor channel characteristics (e.g. a large pathloss). When a poor coverage class (e.g. extended coverage) is configured for a specific UE, a BS may use a method such as repetition to ensure that the UE can properly receive data. To ensure reliable transmission of a control channel, control information is preferably transmitted according to a transmission method suitable for the coverage class. Accordingly, it may be preferable to differently configure a control channel according to the coverage level of the UE. However, if operations such as different repetitions are performed in the same band, a problem such as collision may occur at the transmission time. Therefore, different control channel resources may be configured for the respective coverage levels such that different transmission methods are employed on the resources, as shown in FIG. 8.

Figure 9:
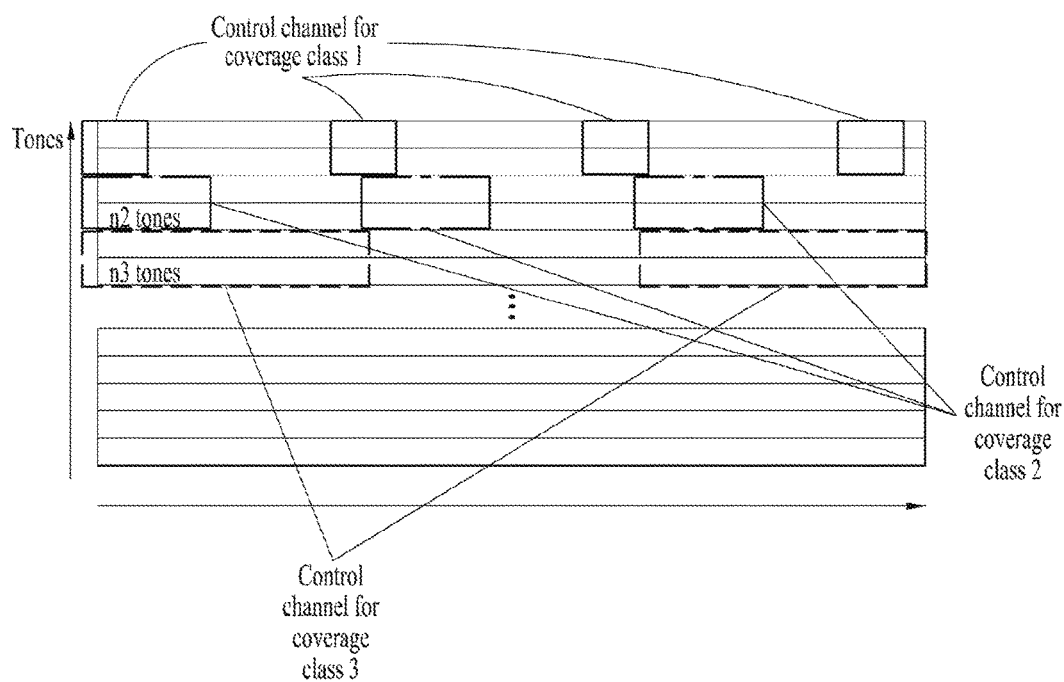

Alternatively, when a control channel is configured in the time domain, one control channel resource may be defined and shared by all UEs as shown in FIG. 7. In this case, the size and transmission period of the control channel resource may be predefined, or may be transmitted from the BS to the UE through SI or higher-layer signaling. Alternatively, if a plurality of control channel resources is defined (for, e.g., respective coverage levels and for a common downlink control information (DCI) channel, if present) as shown in FIG. 9, the size of each resource and the transmission period may be predefined for each resource or may be transmitted from the BS to the UE through SI or higher-layer signaling.

Additionally, a control channel or DCI for a UE is not transmitted on all control channel resources shown in FIG. 7. Further, more than one control channel resource is used to transmit/receive one control channel or DCI. That is, one control channel or DCI may be transmitted or received through two or more control channel resources. Of course, it is apparent that one control channel or DCI may be transmitted or received through one control channel resource.

If a UE is configured for a specific coverage class, the UE searches for control information therefor on a control channel corresponding to the specific coverage class. Configuring control channels for the respective coverage classes may be configured in the SI directed to the UE.

Control channels can be separated from data channels at least for the following reasons.

A control channel includes scheduling information such as the resource for a data channel and a modulation and coding scheme (MCS).
A time to receive the control channel is pre-designated or configured through SI.

The data channel may be received without a control channel. Typically, it may be assumed that a data channel has a control channel associated therewith.

Downlink control information (DCI) is transmitted over control channels for respective coverage classes. Each coverage class is assigned a UE. For the DCI, common DCI (CDCI) which is read by all UEs or dedicated DCI (DDCI) for corresponding UEs is multiplexed and transmitted.

In the following description, UEs may individually receive configuration of a resource for the CDCI which is independently established for each coverage level by the BS or configuration for a specific coverage level (e.g., the coverage level for the poorest channel) may be shared.

DCI may be transmitted to the respective UEs according to the methods described below. The methods are simply illustrative, and the order of the operations described below may not be significant.

Methods of multiplexing and transmitting multiple pieces of DCI for multiple UEs on a physical channel (e.g., PDSCH) may be broadly divided into the following options. For the methods, it is assumed that the time/frequency resources for transmission are configured as described above.

Option 1. One medium access channel (MAC) element may multiplex multiple pieces of DCI, and thus one MAC protocol data unit (PDU) may be mapped to one PDSCH. This may mean that a UE needs to read all MAC PDUs to detect DCI thereof. The length of a MAC PDU may depend on the number of users and the number of scheduling.

Figure 10:
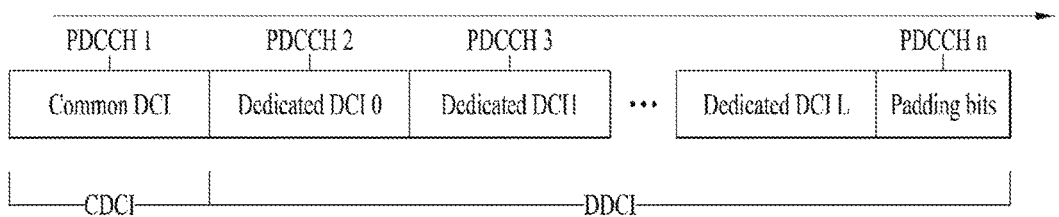
FIG. 10 is a diagram illustrating configuration of the CI according to an embodiment of the present invention.

Option 2. One MAC element may contain only one piece of DCI, and one MAC PDU may be mapped to one PDSCH. In FIG. 10, this means that one piece of DCI is mapped to one PDSCH. A UE may begin to read PDSCHs one by one from the start point of the control channel. When the DCI for the UE is detected, the UE may not attempt to perform the detection operation anymore. To facilitate the detection operation of the UE, PDSCHs may be arranged in order of C-RNTIs of scheduled UEs. When a UE detects a DCI item greater than the C-RNTI thereof, the UE may stop detection, considering that a DCI item for the UE will not be transmitted thereafter. To transmit common data, DCI corresponding to an RNTI corresponding to the common data may be placed at the first position. As long as the pieces of DCI have the same size and are in the same coverage class, it may be assumed that respective PDSCHs have the same transmission time duration. For example, when it is assumed that a control channel is repeated for a duration of 100 ms every 0.5 seconds, the method of Option 2 may be implemented as shown in FIG. 10.

Option 3: Similar to Option 2, one PDSCH/PDCCH may contain only one piece of DCI, but multiple candidates may be provided for a corresponding resource. For example, when all resources on which a control channel is transmitted/received simultaneously are divided in units of slots or resource blocks (minimum resource blocks in which one piece of DCI is transmittable), N resource blocks may be assumed to be provided. Among the resource blocks, a position at which the DCI for the UE may be arranged may be determined as follows. For the common data, Yk=(Maximum RNTI−RNTI). For example, when RNTI values are added to the common data one by one from the greatest value, the UE may use a value obtained by subtracting the RNTI thereof from the maximum RNTI as an index. This index may be interpreted as indicating the number of resources to be allocated to the common data. Alternatively, Yk=0 may be set for the common data, and RNTIs added to the common data may be used differently. For a typical UE, it is assumed that the number of candidates may be preset to 'k' or may be set to a value which can be configured by the network. The index of each resource block is Yk=(A*Yk−1) mode D, Y−1=C-RNTI, where A and D may be randomly set to great numbers. K may increase every time the control channel monitoring occasion occurs, increase in every frame, or be set to the first slot index of a control monitoring occasion. All k candidates from the index may be determined by adding an "offset". The offset may be configured by the network or may be set to a value mapped to the C-RNTI of the UE.

Option 4: This option is similar to Option 2. However, in this option, DCI to be transmitted is subjected to CDM with specific sequences. Each sequence is subdivided according to RNTIs allocated to the respective UEs. Subdivision may be implemented by associating initial values of the respective sequences with the RNTIs of the UEs. For the common DCI, an RNTI (e.g. maximum RNTI) for the common DCI may be assigned to the common DCI. This assignment may be predefined or announced to the UE through SI or higher-layer signaling.

A combination of the options above may be used in one control channel resource. In particular, separately from multiplexing of DDCI, multiplexing of CDCI and DDCI may be performed according to Option 2 such that the CDCI can be independently read.

The above options may be applied to all or some of the control channel resources. Accordingly, it is possible to transmit the DCI according to a combination of the options above. For example, the control information may be transmitted using the following methods:

A. Using Option X only for one control channel resource;
B. Using Option X only for N control channel resources;
C. Using Option X for DDCIs for UEs multiplexed and Option 2 for CDCI;
D. Using independent resources for the CDCI;
a) Using Option X only, where one control channel resource and one piece of DCI are shared by all UEs
b) Using Option X only, where N control channel resources are used, and all UEs using each resource share one piece of DCI, wherein Different resources are allocated to the UEs according to the respective coverage levels;
c) Using Option X for the CDCI for coverage levels and DDCIs for UEs subjected to multiplexing.

If the common DCI is transmitted for each coverage level on an independent resource, the content of CDCI may be divided into CDCI using independent resources and CDCI for respective coverage levels. For simplicity of description, the CDCI using the independent resources will be referred to as cell-specific CDCI (C-CDCI), and CDCI for respective coverage levels will be referred to as coverage-level-specific-CDCI (CL-CDCI).

When Option 1, Option 2, or Option 3 is used to transmit a control channel or DCI, a UE may need to know the total length of the DCI.

For example, in Option 1, one MAC element is mapped to one control channel by multiplexing multiple DCIs, and accordingly a UE needs to identify the total length of the control channel or the length of the DCI therefor to discover the DCI therefor even if the UE has successfully decoded the control channel. In Option 2, one MAC element is mapped to one control channel by multiplexing one DCI, and accordingly, a UE needs to identify the length of the control channel therefor, the length of all control channels, or the length of the control channel/DCI therefor to discover the DCI therefor. In addition, when the UE discovers (or successfully decodes or receives) the control channel/DCI therefor, the UE need not monitor subsequent control channels anymore.

In this case, the BS may transmit the length of the DCI to the UE using the following methods:

Alternative 1: The length of the DCI may be broadcast in SI;

Alternative 2: Preambles tied to lengths of DCI may be configured, and the BS may transmit DCI with a preamble corresponding to the length of the DCI concatenated to the front of the DCI among the pre-configured preambles, and the UE may identify the length of the DCI by performing blind decoding on the sequence used for the preamble;

Alternative 3: The length of the DCI may be included in the common DCI. In this case, the sum of the length of CDCI and the length of DDCI or the length of the DDCI may be transmitted as the length of the DCI. In this case, it may be assumed that CDCI is basically transferred and that the DCI format of the CDCI includes the length of a subsequent control channel. If there is no scheduling for the CDCI, it may be assumed that all fields except the length field are set to a predetermined value (e.g., 0). In this case, the common data may be considered as being transferred according to Option 2, and the other control channels may be considered as being transferred according Option 1. That is, a PDCCH/PDSCH to which one DCI (i.e., CDCI) is mapped may come first, and include a length and scheduling of the CDCI. Thereafter, when Option 1 is used, another PDCCH/PDSCH having DCI for multiple UEs multiplexed with one MAC PDU may be transferred;

Alternative 4: A new channel may be introduced and the length of DCI may be indicated every time a control channel monitoring occasion is given. For example, a channel for transmitting 3 bits corresponding to a length may be configured. For example, the channel may be designed by modifying the SSS(secondary synchronization signal) sequence a little or adding fewer bits to the PDCCH. This channel may be transmitted through resources which are shorter than one slot, and be multiplexed with a control channel within one slot;

Alternative 5: The length of a control channel or the number of the scheduled DCIs may be multiplexed in scrambling a pilot signal or reference signal. For example, scrambling of the pilot may be performed through the length and a cell ID;

Alternative 6: The length of DCI may be included in special DCI. In this case, the sum of the length of CDCI and the length of DDCI may be transmitted as the length of the DCI. In this case, it may be assumed that the special DCI is basically transferred and that the DCI format transferred through the special DCI includes the length of a subsequent control channel. With this method, the special DCI may be considered as being transferred according to Option 2, and the other control channels may be considered as being transferred according to Option 1. That is, a PDCCH/PDSCH to which one DCI (i.e., the special DCI) is mapped may be transferred first, and include the length of the DCI or other information. Thereafter, when Option 1 is used, another PDCCH/PDSCH having DCI for multiple UEs multiplexed with one MAC PDU may be transferred.

In addition, the length of DCI may be transmitted using one of the following methods:

Transmitting Length Per Control Channel Monitoring Occasion:

the UE expects that the information about the length of the DCI will be received in each control channel monitoring occasion. The expectation is based on the assumption that transmission is performed using the corresponding method at the start point of every control channel. When Option 4 of scrambling the length in the RS is considered, the RS transmitted in every slot in which a control channel is transmitted may scramble the same DCI length. This method is disadvantageous in terms of overhead. With this method, Alternative 1 may not be utilized.

Transmitting Length in Every "m" Control Channel Monitoring Occasions:

To reduce overhead, every certain number of monitoring occasions may be bundled and provided with fixed length and scheduling. Thereby, it is assumed that the same length is used in m control channel monitoring occasions. This method may have lower flexibility, but reduce overhead. With this method, Alternative 1 may not be utilized.

Transmitting Length in SI:

As the length is transmitted in SI in Alternative 1, overhead may be reduced.

In the description above, the length of the DCI may be replaced by the number of pieces of DCI.

A UE may recognize, from the common DCI, presence of control information necessary therefor in the corresponding DCI and DDCI containing the control information transmitted thereto. To this end, a DCI indicator (DI) may be transmitted in the CDCI from the BS to the UE. The DI consists of K bits, each of which indicates a UE group. The DI indicates whether it contains DCI for each UE group in the form of a bitmap. For example, when K=3, and the transmitted DI=101, the corresponding DCI includes DCI for UE groups 0 and 2, but does not include DCI for UE group 1. In addition, the DCI may indicate that DCI 0 is DCI for UE group 0 and DCI 1 is DCI for UE group 2. To this end, UEs are divided into K UE groups, and each UE may be provided with configuration of a UE group to which the UE belongs, through higher-layer signaling or SI. Alternatively, a UE may use the C-RNTI thereof to calculate a corresponding UE group. To this end, after receiving DCI, the UE may decode CDCI first, and then decode the DDCI in the remaining part of the DCI based on the corresponding information. Thereby, the UE may obtain control information transmitted thereto. Additionally, in the above example, DDCI for UE group 1 is not included. Accordingly, after decoding the DI included in CDCI, UEs belonging to UE group 1 may wait or stay in the sleep mode until the time at which the UEs will receive the next CDCI.

More specifically, some of the bits of the DI may be allocated to common data or group cast. These bits may be used to announce presence/absence of common data or group cast. The size K of the DI field and the size of the DCI length field may be predetermined, or may be transmitted from the BS to the UE through SI or higher-layer signaling. Alternatively, the total length of CDCI (or C-CDCI and CL-CDCI) may be predetermined or transmitted from the BS to the UE through SI or higher-layer signaling. In particular, one DI may be transmitted for all cells, or one DI may be transmitted per coverage level. In this case, the DI size may be variable among the coverage levels, and the corresponding length thereof may be predefined or transmitted to the UE through higher-layer signaling, or may be operatively connected with the control channel resource sizes of the respective coverage levels.

When the DI is contained in the CDCI, the DI may be signaled in a manner similar to signaling of the DCI length. The DCI length and the DI may be signaled simultaneously. When necessary, only the DI may be transmitted using a method proposed above, without transmitting the DCI length. That is, the transmission method and transmission timing for the DI may be implemented using the methods described above for transmission of the DCI length.

If CDCI is used to signal the DCI length (Alternative 3), and the DCI length and the DI are transmitted simultaneously, the CDCI may contain the DI and the DCI length.

Alternatively, the DCI length may be inferred from the DI. If the UE infers from the DI that P (P<=K) kinds of DCI are transmitted, the length of the DCI equals the sum of the length of the CDCI and P times the length of the DDCI. Alternatively, the DCI length may not include the length of the CDCI, but carry P times the length of the DDCI. If it is possible to infer the DCI length from the DI, a separate DCI length may not be transmitted to the UE.

After generating the DCI, the BS may select a proper DCI length index (e.g., an index corresponding to the shortest DCI length from among DCI length indexes corresponding to DCI lengths greater than or equal to the length of the DCI to be actually transmitted among the DCI lengths) in a predetermined DCI length table and transmit the same, with the remaining bits filled with a DCI length corresponding to a DCI length index through zero padding. For example, when a DCI length index table as shown below is provided, and the length of the DCI to be actually transmitted is 70 bits, the DCI length index is 1, and the number of padding bits is 10.

TABLE 6

| DCI length index | DCI length |
| --- | --- |
| 0 | 50 bits |
| 1 | 80 bits |
| 2 | 110 bits |
| 3 | 140 bits |

Each DCI may contain the following information:
Downlink/uplink scheduling;
Random access channel (RACH) information.

If CDCI to be transmitted is subdivided into C-CDCI and CL-CDCI, the contents thereof may also be subdivided as follows:
C-CDCI: DI;
CL-CDCI: DCI length.

Figure 11:
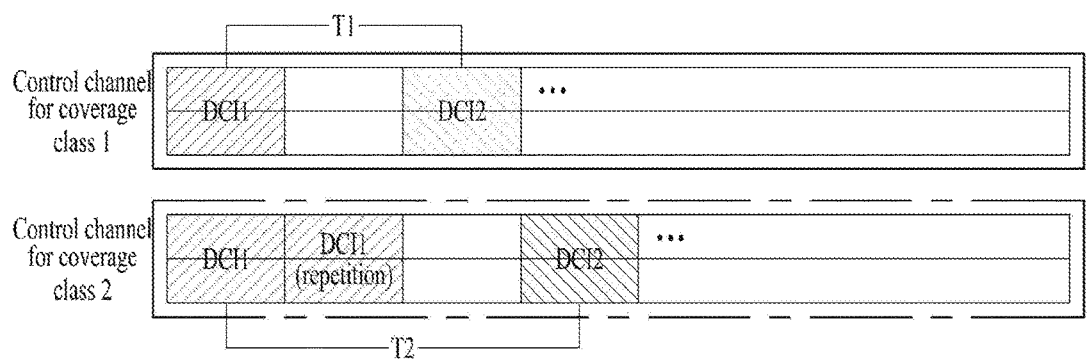
FIG. 11 illustrates a repetition of the CI according to an embodiment of the present invention.

There may be configuration for coverage enhancement according to DCI resources for the respective coverage classes. For example, the number of repetitions of the DCI for each coverage class and the transmission period of each DCI (T1, T2 in FIG. 11) may be configured. The DCI configurations (the number of repetitions, the transmission period, or the like) for the respective coverage classes are applied to the whole DCI transmitted on the control channel for the corresponding coverage class.

Figure 12:
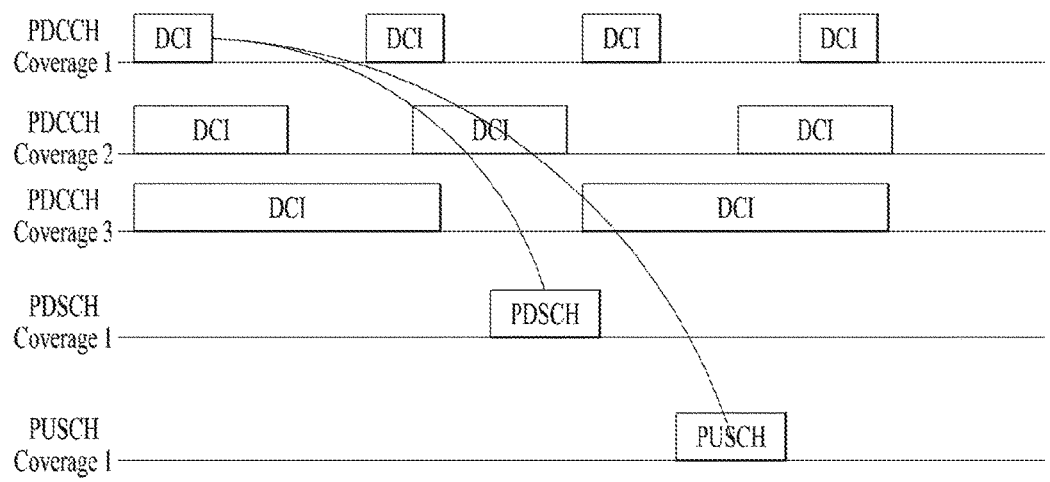
FIG. 12 illustrates a downlink-related operation of a UE according to an embodiment of the present invention.

Accordingly, the UE may receive a PDCCH (or DCI) and a PDSCH indicated by the received PDCCH, and transmit ACK/NACK according to the received PDCCH/PDSCH over a PUSCH, as shown in FIG. 12. While a PDSCH for coverage (class) 1 is illustrated as being scheduled by the leading DCI in FIG. 12, it is also possible that the UE receives the PDSCH after receiving DCIs for two or more coverage classes as described above. In some cases, the UE may receive the PDSCH therefor only when the UE receives a plurality of pieces of DCI (PDCCH).

Configuration of the DCI is contained in the SI transmitted from the BS. This configuration may be transmitted from the BS to the UE over a channel (e.g., a broadcast channel such as a Physical Broadcast Channel (PBCH)) separate from the control channel. In particular, the SI contents may depend on the transmission option of the DCI.

SI may contain the following content:
the number of scheduled UEs;
a coverage class of each UE;
RACH configuration;
PDCCH configuration;
DCI configuration for each coverage class; or
DI.

The PDCCH configuration may contain the following kinds of information:
the size of the whole control channel;
control channel resource location (in the time and frequency domains);
DCI transmission period;
DCI length; or
a modulation scheme for DCI.

When PDCCH configuration is given for each of the coverage classes, the PDCCH configuration may contain the following kinds of information:
control channel size for the coverage class;
control channel resource location for the coverage class (in the time and frequency domains);
DCI length;
DCI transmission period;
a modulation scheme for DCI; or
the number of repetitions of DCI.

In this case, the PDCCH configuration may contain only information common to the PDCCH configurations for the respective coverage classes.

The common PDCCH configuration and the PDCCH configurations for the respective coverage classes may be managed as one configuration. That is, PDCCH configuration may be transmitted, carrying all kinds of information contained in the common PDCCH configuration and the PDCCH configurations for the respective coverage classes.

In the case where there are PDCCH configurations for the respective coverage classes and a separate broadcast channel provided as described above, when the broadcast channel is transmitted in a region including the PDCCH region, the transmission timing for the broadcast channel may overlap the transmission timing of the DCI. In this case, the UE assumes that the DCI is transmitted, skipping the broadcast channel.

For example, when the transmission resources for DCI overlap the transmission resources for a broadcast channel as shown in FIG. 13(a), the broadcast channel may be transmitted as shown in FIG. 13(b), while the DCI may be shifted in the time domain to be transmitted.

To this end, the DCI transmission period needs to be determined in consideration of delay time according to the broadcast channel. The above method may be used even when the transmission timing of the DCI overlaps that of the broadcast channel at a plurality of moments.

DDCI for UE Groups

The C-RNTI, the DDCI indicator of CDCI may be transmitted according to the UE-group base rather than to the UE base, and resources for DDCI may be divided according to the UE-group base. In this case, when the UE confirms in the CDCI that DDCI is transmitted in the UE group to which the UE belongs, the UE may attempt to perform DDCI decoding for the DDCI location defined for the UE group to which the UE belongs.

The DDCI locations for UE groups may be equally divided according to the UE groups. When the total number of DDCI resources is 8, and 4 UE groups are defined, the number of DDCI resources assigned to each UE group may be 2. Accordingly, when a UE belonging to UE group 2 among UE groups 1 to 4 confirms from the CDCI that DDCI for the UE group to which the UE belongs is transmitted, the UE may attempt to perform DDCI decoding on DDCI resources 3 and 4 among DDCI resources 1 to 8.

Alternatively, the BS may announce the number of DDCIs transmitted for each UE group. For example, if the total number of DDCI resources is 8, 4 UE groups are defined, and the BS may announce that the numbers of DDCI resources allocated to UE groups is 3, 0, 2 and 3, respectively. In this case, if the UE belongs to UE group 3 among UE groups 1 to 4, the UE may perform DDCI decoding on t DDCI resources 4 and 5 among DDCI resources 1 to 8. In addition, if the UE belongs to UE group 2, the UE may wait or stay in the sleep mode until the next DDCI indicator reaches the UE.

While the invention has been described above focusing on the clean-slate solution, particularly, NB-CIoT technology discussed in GERAN for simplicity, the invention is also applicable to other communication systems. The disclosed technologies may be employed exclusively or in combination thereof.

Figure 14:
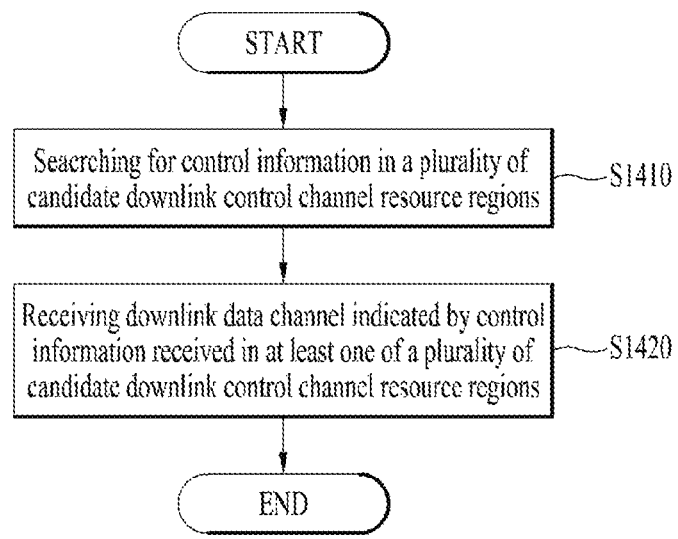
FIG. 14 illustrates operation of a UE according to an embodiment of the present invention.

FIG. 14 illustrates an operation according to an embodiment of the present invention.

FIG. 14 illustrates a method for receiving a downlink signal in a wireless communication system. The method is implemented by a cellular IoT (internet of things) (CIoT) UE.

The UE may search for control information directed thereto in a plurality of candidate downlink control channel resource regions corresponding to a coverage class of the UE on some frequency resources within a downlink resource (S1410). The UE may receive a downlink data channel indicated by control information received in at least one of the candidate downlink control channel resource regions (S1420).

The plurality of candidate downlink control channel resource regions may be configured to have a period set for each of coverage classes, and each of the candidate downlink control channel resource regions may be configured to have a duration configured for each of the coverage classes.

In addition, when the UE receives the control information directed thereto over first N regions among the candidate downlink control channel resource regions, the UE may not perform the searching in remaining M-N regions. Herein, M may be the number of the candidate downlink control channel resource regions for the UE, and N may be an integer greater than 1.

The control channel may include the common control information and dedicated control information, wherein the common control information includes cell-specific control information and coverage class-specific control information. The cell-specific control information may be received on a resource independent from the candidate downlink control channel resource regions configured for the respective coverage classes.

In addition, the cell-specific control information may include an indicator indicating whether dedicated control information for the UE is transmitted in association with the cell-specific control information.

The coverage class-specific control information may include information about the length of the dedicated control information for the UE.

Information about the length of the dedicated control information may be received in every K candidate downlink control channel resource regions, where K may be an integer greater than 1.

The dedicated control information for the UE may be signaled using another method. That is, the information about the length of dedicated control information for the UE may be concatenated to a front of the dedicated control information and be transmitted as a preamble associated with the length of the dedicated control information. In addition, the information about the length of the dedicated control information for the UE may be scrambled in a pilot signal or reference signal received in a candidate downlink control channel resource region in which the dedicated control invention is received.

A brief description of embodiments of the present invention has been given above with reference to FIG. 14. However, an embodiment related to FIG. 14 may alternatively or additionally include at least one part of the embodiment(s) described above.

Figure 15:
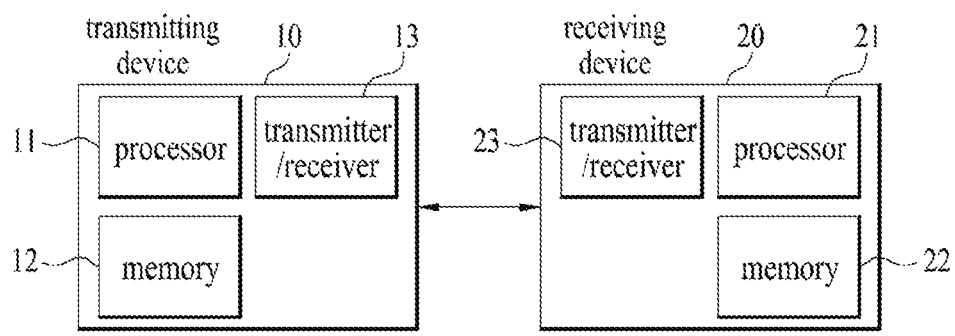
FIG. 15 is a block diagram illustrating apparatuses for implementing one or more embodiments of the present invention.

FIG. 15 is a block diagram of a transmitting device 10 and a receiving device 20 configured to implement exemplary embodiments of the present invention. Referring to FIG. 15, the transmitting device 10 and the receiving device 20 respectively include transmitter/receivers 13 and 23 for transmitting and receiving radio signals carrying information, data, signals, and/or messages, memories 12 and 22 for storing information related to communication in a wireless communication system, and processors 11 and 21 connected operationally to the transmitter/receivers 13 and 23 and the memories 12 and 22 and configured to control the memories 12 and 22 and/or the transmitter/receivers 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the transmitter/receiver 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transmitter/receiver 13 may include an oscillator. The transmitter/receiver 13 may include Nt (where Nt is a positive integer) transmit antennas.

A signal processing process of the receiving device 20 is the reverse of the signal processing process of the transmitting device 10. Under the control of the processor 21, the transmitter/receiver 23 of the receiving device 10 receives RF signals transmitted by the transmitting device 10. The transmitter/receiver 23 may include Nr receive antennas and frequency down-converts each signal received through receive antennas into a baseband signal. The transmitter/receiver 23 may include an oscillator for frequency down-conversion. The processor 21 decodes and demodulates the radio signals received through the receive antennas and restores data that the transmitting device 10 wishes to transmit.

The transmitter/receivers 13 and 23 include one or more antennas. An antenna performs a function of transmitting signals processed by the transmitter/receivers 13 and 23 to the exterior or receiving radio signals from the exterior to transfer the radio signals to the transmitter/receivers 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

The transmitting device and/or the receiving device may be configured as a combination of one or more embodiments of the present invention.

The embodiments of the present application has been illustrated based on a wireless communication system, specifically 3GPP LTE (-A), however, the embodiments of the present application can be applied to any wireless communication system in which interferences exist.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of receiving a downlink signal in a wireless communication system, the method being performed by a cellular-IoT (Internet of things) (CIoT) mobile terminal and comprising:

searching for control information directed to the mobile terminal in a plurality of candidate downlink control channel resource regions corresponding to a coverage class of the mobile terminal on a part of a downlink resource; and receiving a downlink data channel indicated by control information received in at least one of the plurality of candidate downlink control channel resource regions, wherein the plurality of candidate downlink control channel resource regions is configured to have a period set for each of coverage classes, wherein each of the plurality of candidate downlink control channel resource regions is configured to have a duration configured for each of the coverage classes, wherein the control information comprises common control information and dedicated control information, wherein the common control information comprises cell-specific control information and coverage class-specific control information, wherein the cell-specific control information is received on a resource independent from the plurality of candidate downlink control channel resource regions configured for each of coverage classes, and wherein information about a length of dedicated control information for the mobile terminal is scrambled with a pilot signal or reference signal received in a candidate downlink control channel resource region in which the dedicated control information is received.

2. The method according to claim 1, wherein, when the mobile terminal receives the control information directed to the mobile terminal over first N regions among the plurality of candidate downlink control channel resource regions, the mobile terminal is configured not to perform the searching in remaining M-N regions of the plurality of candidate downlink control channel resource regions,
wherein M is the number of the plurality of candidate downlink control channel resource regions for the mobile terminal, and N is an integer greater than 1.

3. The method according to claim 1, wherein the cell-specific control information comprises an indicator indicating whether dedicated control information for the mobile terminal is transmitted in association with the cell-specific control information.

4. The method according to claim 1, wherein the coverage class-specific control information comprises the information about the length of dedicated control information for the mobile terminal.

5. The method according to claim 4, wherein the information about the length of the dedicated control information is received in every K candidate downlink control channel resource regions of the plurality of candidate downlink control channel resource regions,
where K is an integer greater than 1.

6. The method according to claim 1, wherein the dedicated control information directed to the mobile terminal is followed by the information about the length of dedicated control information for the mobile terminal as a preamble associated with the dedicated control information.

7. A cellular-IoT (Internet of things) (CIoT) mobile terminal configured to receive a downlink signal in a wireless communication system, the mobile terminal comprising:
a transmitter and a receiver; and
a processor configured to control the transmitter and the receiver,
wherein the processor is configured to:
search for control information directed to the mobile terminal in a plurality of candidate downlink control channel resource regions corresponding to a coverage class of the mobile terminal on a part of a downlink resource; and
receive a downlink data channel indicated by control information received in at least one of the plurality of candidate downlink control channel resource regions, wherein the plurality of candidate downlink control channel resource regions is configured to have a period set for each of coverage classes, wherein each of the plurality of candidate downlink control channel resource regions is configured to have a duration configured for each of the coverage classes, wherein the control information comprises common control information and dedicated control information, wherein the common control information comprises cell-specific control information and coverage class-specific control information, wherein the cell-specific control information is received on a resource independent from the plurality of candidate downlink control channel resource regions configured for each of coverage classes, and wherein information about a length of dedicated control information for the mobile terminal is scrambled with a pilot signal or reference signal received in a candidate downlink control channel resource region in which the dedicated control information is received.

8. The mobile terminal according to claim 7,
wherein, when the processor receives the control information directed to the mobile terminal over first N regions among the plurality of candidate downlink control channel resource regions, the processor is configured not to perform the searching in remaining M-N regions of the plurality of candidate downlink control channel resource regions,
wherein M is the number of the plurality of candidate downlink control channel resource regions for the UE, and N is an integer greater than 1.

9. The mobile terminal according to claim 7, wherein the cell-specific control information comprises an indicator indicating whether dedicated control information for the mobile terminal is transmitted in association with the cell-specific control information.

10. The mobile terminal according to claim 7, wherein the coverage class-specific control information comprises the information about the length of dedicated control information for the mobile terminal.

11. The mobile terminal according to claim 10, wherein the information about the length of the dedicated control information is received in every K candidate downlink control channel resource regions of the plurality of candidate downlink control channel resource regions,
where K is an integer greater than 1.

12. The mobile terminal according to claim 9, wherein the dedicated control information directed to the mobile terminal is followed by the information about the length of dedicated control information for the mobile terminal as a preamble associated with the dedicated control information.

* * * * *